US009086305B2

(12) United States Patent
Nelson

(10) Patent No.: US 9,086,305 B2
(45) Date of Patent: Jul. 21, 2015

(54) PADDLEWHEEL FLOW METER WITH IMPROVED SERVICABILITY AND IMPROVED RELIABILITY UNDER HARSH OPERATING CONDITIONS

(71) Applicant: Sur-Flo Meters & Controls Ltd., Calgary (CA)

(72) Inventor: Darrell Nelson, Calgary (CA)

(73) Assignee: Sur-Flo Meters & Controls Ltd., Calgary, Alberta (CA)

(*) Notice: Subject to any disclaimer, the term of this patent is extended or adjusted under 35 U.S.C. 154(b) by 86 days.

(21) Appl. No.: 13/875,800

(22) Filed: May 2, 2013

(65) Prior Publication Data

US 2014/0326075 A1 Nov. 6, 2014

(51) Int. Cl.
*G01F 1/06* (2006.01)
*G01F 1/075* (2006.01)

(52) U.S. Cl.
CPC . *G01F 1/075* (2013.01); *G01F 1/06* (2013.01)

(58) Field of Classification Search
CPC .................................. G01F 1/06; G01F 1/065
USPC ................. 73/86.87, 861.86, 861.79, 861.33, 73/866.5, 861.01, 861.77
See application file for complete search history.

(56) References Cited

U.S. PATENT DOCUMENTS

| | | | | |
|---|---|---|---|---|
| 4,656,873 | A | * | 4/1987 | Stewart ...................... 73/861.33 |
| 5,182,952 | A | * | 2/1993 | Pyzik .......................... 73/861.79 |
| 7,730,798 | B2 | * | 6/2010 | Linden et al. ................ 73/866.5 |
| 2004/0221919 | A1 | * | 11/2004 | MacNeal et al. .............. 141/384 |

* cited by examiner

*Primary Examiner* — Lisa Caputo
*Assistant Examiner* — Nigel Plumb
(74) *Attorney, Agent, or Firm* — Kyle R. Satterthwaite; Ryan W. Dupuis; Ade & Company Inc.

(57) ABSTRACT

In a flow meter, a rotor support body carries a paddlewheel rotor in an operational position exposed to a through-flow bore of a flow meter housing. A sensor unit is operable to detect rotation of the rotor and provide output responsive to same for use by a monitoring system in determining a flow rate of fluid passing through the housing. The support body and the sensor unit are removable from the housing, for inspection, service, repair or replacement independently of the housing, with the sensor unit being removable independently of the support body for improved serviceability. The rotor is carried on a support shaft with a reduced diameter portion for contact-free rotation of the rotor around this reduced diameter portion, reducing an area of the shaft over which tight machining tolerances are required to prevent ingress of particulate matter that can lead to inaccurate flow measurements and increased wear rates.

17 Claims, 4 Drawing Sheets

PADDLEWHEEL FLOW METER WITH IMPROVED SERVICABILITY AND IMPROVED RELIABILITY UNDER HARSH OPERATING CONDITIONS

FIELD OF THE INVENTION

The present invention relates generally to flow meters, and more particularly to a paddlewheel type flow meter in which internal components of the meter housing are independently replaceable and include a self-aligning rotor support body and a varying diameter rotor shaft using tight tolerances to achieve accurate reliable operation while preventing particulate penetration under exposure to harsh operating conditions.

BACKGROUND OF THE INVENTION

Flow meters more measuring fluid flow rates through pipe lines are used in various industries. In-line flow meters employing paddlewheel-type rotors are among known flow meter types, and use the speed of driven rotation of the paddlewheel rotor by the passing fluid to calculate the rate at which the fluid is flowing through the pipe line at the location at which the flow meter is installed in series in between adjacent pipe sections. Some of these meters, prior art examples of which are listed below, employ T-shaped housings or pipe fittings, where a through-bore of the housing is coupled inline between two pipe sections, and a blind-bore perpendicular to the through-bore is used to house a support arrangement for the paddlewheel and an associated sensor for detecting the rotational speed of the paddlewheel.

Many commercially available flow meters are not suitable for use in harsh operating conditions, for example in the oilfield industry, where fluid lines being monitored may be subject to one or more extreme conditions, including high operating pressures, abrasive particulate matter (e.g. sand) carried in the fluid, and/or caustic chemical content. Some prior art flow meter designs include such features as paddlewheel rotors of plastic construction, which are eroded away under such operating conditions, and/or use of roller bearings, the seals of which may be prone to failure under high pressure conditions and/or abrasive conditions, thus leading to penetration of particulate into the bearing, causing wear that can lead to reduced rotational stability causing inaccurate flow readings, and eventual operational failure.

Another known issue is that many prior art designs have limited or non-existent on-site serviceability, whereby failure of any given internal component of the flow meter requires that the entire unit be removed from the pipeline for repair or replacement. Other prior art flow meters have allowed for some improvement by using removable installation of a support structure in the housing for carrying the paddlewheel and associate sensor, but require replacement of this entire internal working assembly, even if only one particular component thereof has failed or worn to a replacement-requiring level.

Accordingly, there remains room for improvement in the area of flow meters, and a particular desire for a paddlewheel flow meter with a high level of serviceability and a robust design providing reliability even in relatively harsh operating conditions.

SUMMARY OF THE INVENTION

According to a first aspect of the invention there is provided a paddlewheel flow meter comprising:

a housing having an internal through-flow bore passing therethrough on a flow direction axis, and an internal mounting bore extending into the housing on a mounting bore axis transverse to through-flow bore and opening into the through-flow bore;

a rotor support body having inner and outer ends spaced apart along a longitudinal axis and a paddlewheel rotor rotatably supported for rotation about a rotational axis lying transverse to the longitudinal axis in a hollow rotor cavity of the rotor support body adjacent the inner end thereof, the rotor support body being arranged for removable receipt thereof in the mounting bore at an operational position in which the paddlewheel rotor reaches into the through-flow bore for driven rotation of the paddlewheel rotor by movement of flowable material through the through-flow bore; and a sensor unit arranged for removable receipt in the mounting bore at an installed position placing a rotational sensor of the sensor unit at a useful position operable to detect rotational motion of the paddlewheel rotor about the rotational axis;

wherein the sensor unit and rotor support body are distinct units that are replaceable separately of one another, thereby enabling replacement of the sensor independently of the rotor, or vice versa, by replacement of only one of the sensor unit and the rotor support body.

Preferably the sensor unit is received in a hollow sensor cavity of the rotor support body in the installed position.

Preferably the hollow sensor cavity extends into the rotor support body at the outer end thereof.

Preferably the hollow sensor cavity of the rotor support body is internally threaded, and the sensor unit is externally threaded for mating threaded engagement thereof in the hollow sensor cavity.

Preferably the rotor support body is sealed to a boundary wall of the mounting bore around a periphery of the rotor support body.

Preferably there is provided at least one annular seal disposed around the rotor support body.

Preferably the rotor support body, in the operational position, resides entirely outside the through-flow bore.

Preferably the inner end of the rotor support body is concavely contoured about a center axis of curvature that lies parallel to the flow direction axis of the housing.

Preferably inner end of the rotor support body conforms with an outer surface of a boundary wall of the through-flow bore on either side of an opening in said boundary wall of the through-flow bore, and the paddlewheel rotor reaches into the through-flow bore through said opening in said boundary wall of the through-flow bore.

Preferably there is provided a cap engagable to the housing at an open end of the mounting bore to secure the rotor support body therein.

Preferably the cap is arranged to abut against the rotor support body under engagement of the cap to the housing to clamp the support body in the operational position.

Preferably the cap comprises a through-bore therein to accommodate insertion of the sensor unit and withdrawal thereof through and from the through-bore of the cap for installation and removal of the sensor unit to and from the housing.

Preferably there is provided a support shaft that is carried on the rotor support body and about which the paddlewheel rotor is rotatable, wherein the support shaft is removable from the rotor support body to enable removal of the rotor therefrom.

Preferably the support shaft comprises at least one reduced diameter portion disposed inside a hub of the rotor between larger diameter portions of said shaft, the reduced diameter portion having a clearance space therearound for contactless rotation of the rotor around said reduced-diameter portion.

Preferably there are provided radiused transitions between the reduced diameter portion of the shaft and the larger diameter portions of the shaft.

Preferably a bushing is received within the hub of the rotor for rotation therewith about the shaft.

According to a second aspect of the invention there is provided a paddlewheel flow meter comprising:

a conduit having an internal through-flow bore passing therethrough on a flow direction axis;

a rotor reaching into the through-flow bore and rotatably supported on a support shaft in the housing for rotation about a rotational axis lying transverse to the flow direction for driven rotation of the paddlewheel rotor by movement of flowable material through the through-flow bore; and a sensor operable to detect rotational motion of the paddlewheel rotor about the rotational axis;

wherein the support shaft comprises at least one reduced diameter portion disposed inside a hub of the rotor between larger diameter portions of said shaft, the reduced diameter portion having a clearance space therearound for contactless rotation of the rotor around said reduced-diameter portion.

According to a third aspect of the invention there is provided a paddlewheel flow meter comprising:

a housing having an internal through-flow bore passing therethrough on a flow direction axis, and an internal mounting bore extending into the housing on a mounting bore axis transverse to through-flow bore and opening into the through-flow bore;

a rotor support body having inner and outer ends spaced apart along a longitudinal axis and a paddlewheel rotor rotatably supported for rotation about a rotational axis lying transverse to the longitudinal axis in a hollow rotor cavity of the rotor support body adjacent the inner end thereof, the rotor support body being arranged for removable receipt thereof in the mounting bore at an operational position in which the paddlewheel rotor reaches into the through-flow bore for driven rotation of the paddlewheel rotor by movement of flowable material through the through-flow bore; and a sensor unit operable to detect rotational motion of the paddlewheel rotor about the rotational axis;

wherein the inner end of the rotor support body is concavely contoured to conform with an outer surface of a boundary wall of the through-flow bore on either side of an opening in said boundary wall through which the rotor is arranged to reach into the through-flow bore.

BRIEF DESCRIPTION OF THE DRAWINGS

In the accompanying drawings, which illustrate exemplary embodiments of the present invention.

DETAILED DESCRIPTION

Figure 1:
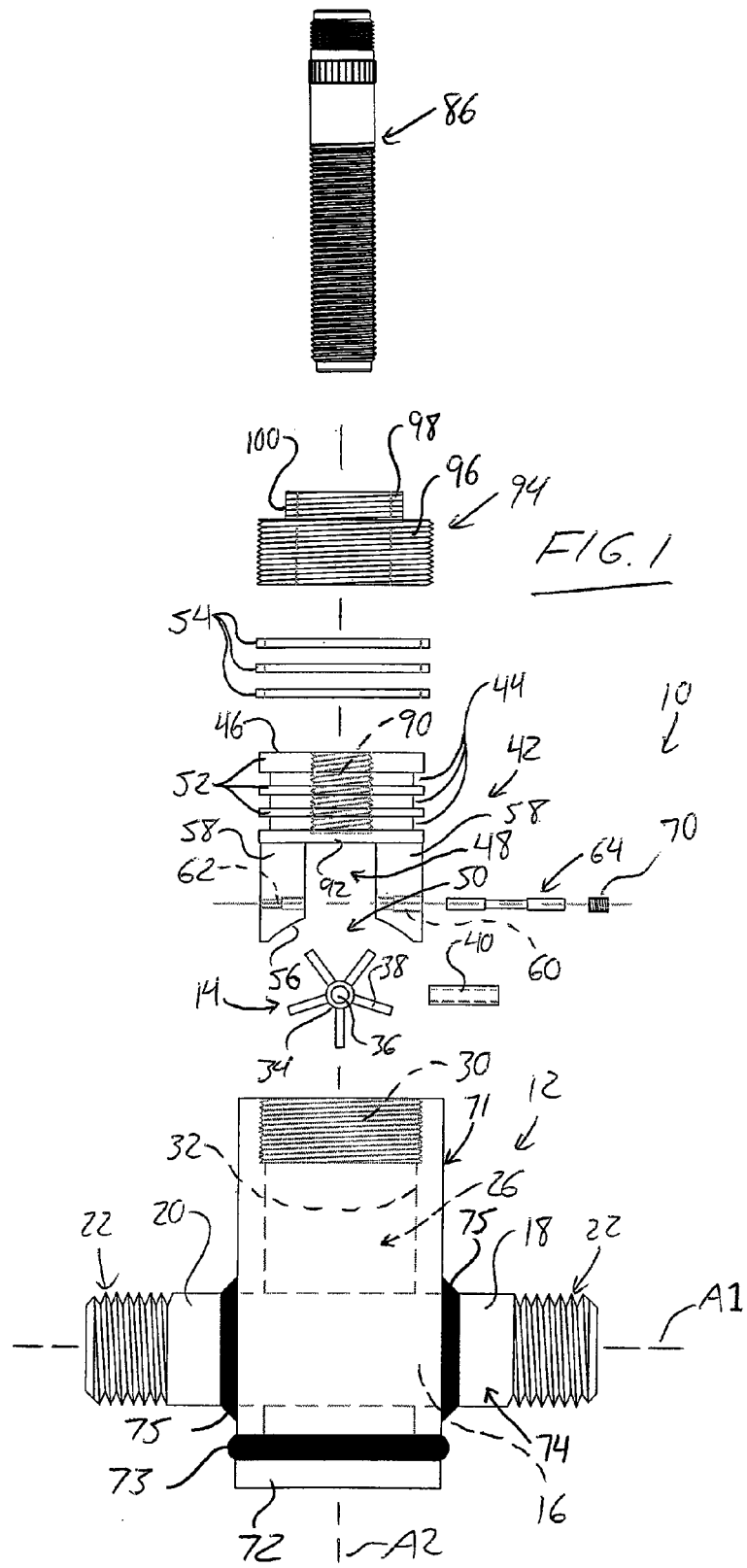
FIG. 1 is an exploded view of a paddlewheel flow meter of the present invention.

With reference to FIG. 1, the flow meter 10 of the illustrated embodiment employs a housing 12 in the form of a T-shaped or t-shaped pipe fitting to house a paddlewheel rotor 14 and an associated sensor to measure flow a fluid through the housing once installed in series between two sections of a pipe line.

Figure 5:
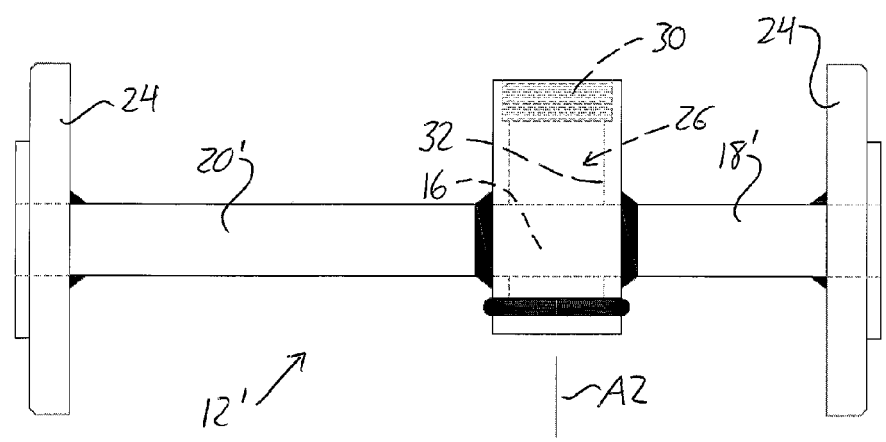
FIG. 5 shows an alternate housing for the flow meter of FIG. 1, employing pipe flanges instead of threaded connections for installation thereof in a pipeline.
Figure 6:
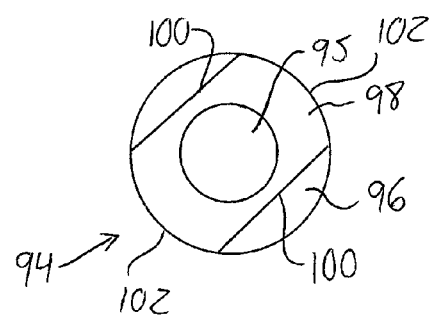
FIG. 6 is an overhead plan view of a removable housing cap of the flow meter of FIG. 1.

The housing 12 has a through-bore 16 passing fully therethrough on a fluid flow axis A1 that defines a direction in which fluid will flow through the housing under use of the flow meter 10. Inlet and outlet ends of the through-bore are defined by two coaxial branches 18, 20 of the overall housing's T- or t-shape, or in other words by the crossing portion of the T- or t-shape. In the version of the flow meter shown in FIG. 1, the outer ends of these branches 18, 20 are externally threaded as shown generally at 22, for example in accordance with National Pipe Thread (NPT) standards, for threaded coupling to each of a pair of pipes with internally threaded ends between which the flow meter is to be installed. The version of the housing 12' shown in FIG. 5 instead employs welded flanges 24 on the coaxial branches 18', 20' to couple with like-flanged ends of pipes between which the flow meter is to be installed. Either way, upon coupling of the housing between the pipes, the internal through-bore 16 of the housing 10 fluidly communicates the two pipes together to form part of the overall pipeline conduit through which a fluid is conveyed. The through-bore 16 thus defines a through-flow bore via which fluid passes through the housing.

A second bore 26 of the housing is not a through-bore, instead extending into the housing inside third branch 28 thereof that lies perpendicular to the first two coaxial branches 18, 20, and opening into the through-bore 16, but without passing fully through the housing across the through-bore. The second bore 26 lies on a second axis A2 that lies perpendicular to the first fluid-flow axis A1. An outer end portion of the second bore 26 located distal to the through-flow bore 16 is internally threaded, as shown at 30, with an unthreaded smooth-walled portion 32 of the second bore 26 spanning the remaining distance to the through-bore 16. The second bore 26 defines a mounting bore into which internal components of the flow meter are installed in operable positions, and from which they are subsequently removable for service or replacement of one or more components, whereby the overall flow meter can be serviced or repaired without full removal thereof from the pipeline, as the housing 12 can be left in place between the adjoining pipe sections.

With continued reference to FIG. 1, the paddlewheel rotor 14 is of a known general structure, featuring a hollow cylindrical center hub 34 with a cylindrical through-bore 36 passing therethrough, the central axis of which corresponds to a rotational axis A3 of the rotor 14 when installed. A plurality of blades 38, for example five blades of planar rectangular form, project radially outward from the outer periphery of the hub 34 at equally spaced circumferential positions therearound, thus completing the paddlewheel shape of the rotor. A hollow cylindrical bushing 40 is press-fit into the bore of the rotor hub 34 to form an interior wear liner for same. The number of rotor blades should be sufficient so that at least one blade will always be exposed to fluid flow in the through-flow bore. For example, the illustrated five blade rotor will always have two blades exposed to fluid flow in the through-flow bore 16. In some embodiments, is the rotor is formed entirely of stainless steel or other corrosion resistant material.

A rotor support member 42 of some embodiments is formed of a solid body of stainless steel or other corrosion resistant material having a generally cylindrical form having been machined to form a series of circumferential grooves 44 at axially spaced-apart locations near, but spaced from, an upper end face 46 of the body; a through-slot 48 cutting diametrically through the body a short distance below the lowermost one of the grooves 44, and an arcuately concave cutaway 50 at the lower end of the body. A largest outer diameter of the body at full-diameter portions 52 thereof remaining intact above and below each groove 44 closely conforms to the diameter of the smooth-walled portion 32 of the mounting bore 26 of the housing, and the internally threaded upper portion 30 of the mounting bore 26 has a slightly larger inner diameter (measured crest-to-crest of the threading) than the smooth-walled unthreaded portion 32 of the same bore 26. Annular seals 54 are provided in equal number to the circumferential grooves 44 for respective seating therein.

The through-slot 48 is rectangular in cross-sectional planes thereof lying parallel to the central axis of the body's generally cylindrical form and perpendicular to the diameter at which the slot 48 passes through the body. The concave cutaway 50 at the lower end of the body has a radius centered on an axis parallel to the diametrical direction in which the slot 48 cuts through the body. The cutaway and the slot 48 overlap in space, whereby the bottom end of the slot 48 is open, and whereby a bottom face of the body features two arcuate spans 56 disposed respectively on opposite sides of the slot 48. An intact leg 58 of the body respectively resides on each side of the slot 48, with the respective arcuate span defined adjacent a lower end of this leg.

A through bore 60 passing through one of the legs 58 is counterbored at the outer side of the leg (i.e. at the outer periphery of the body), while a corresponding second through-bore 62 coaxial with the first through-bore 60 passes through the other leg, but is counterbored from the inner side thereof (i.e. from the slot-adjacent side of the leg). The counterbored inner portion of the second through-bore 62 is of equal diameter to the inner portion of the first through-bore 60. In other words, the counterbore of the first through-bore is of greater diameter than any other part of the aligned through-bores 60, 62. The coincident axes of the through-bores 60, 62 lie diametrically of the body at a short height above the bottom end of the rectangular slot 48.

The open-bottom slot 48 creates a cavity for receipt of the rotor 14 in a position aligning the hub 34 thereof with the diametrical through-bores 60, 62 of the support member body 42, and a support shaft 64 is inserted through the first through-bore 60 for passage of one end of the support shaft 64 onward through the bushing 40 of the rotor hub 34 and into the counterbore of the second through-bore 62.

Figure 4A:
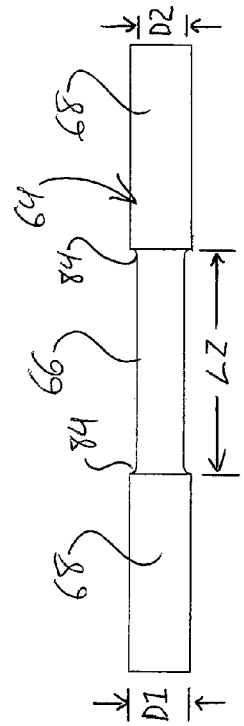
FIGS. 4A and 4B are side and end views of a rotor shaft of the paddlewheel flow meter of FIG. 1.

As best shown in FIG. 4A, the shaft 64 features a reduced-diameter central portion 66 disposed between two end portions 68 of equal diameter grater than the reduced central portion 66. Referring back to FIG. 1, the diameter of the end portions is sufficiently small for passage through both portions of the first through-bore 60 and receipt in the counterbored inner portion of the second through-bore 62, but too large to fit in the outer portion of the second counterbore 62. The shaft length is no greater than the distance between the ends of the two counterbores of the through-bores 60, 62, whereby the installed shaft resides entirely within the inner portions of the two through-bores 60, 62 and the rectangular slot 48 therebetween. The counterbored outer portion of the first through-bore 60 is internally threaded so as to threadingly receive a set screw 70 therein after insertion of the shaft 64, whereby the shaft 64 is secured in the installed position, as the set screw prevents the shaft from backing off into the counterbored outer portion of the first through-bore 60. The shaft and the bushing may be made of the same material as one another.

With the rotor and shaft so installed, the rotor 14 is thus supported on the shaft 64 between the legs 58 of the support body 42 for rotation of the rotor 14 around the shaft axis (which coincides with the hub axis, busing axis, and through-hole axes) near the bottom of the rectangular slot 48. The distance from the coincident axes of the through holes 60, 62 to the closed top end of the slot 48 exceeds the radial span of each rotor blade 38 from the rotor axis, thereby providing clearance for rotation of the rotor inside the slot/cavity 48 defined between the flat, parallel inner sides of the two legs 58. The rotor, bushing, shaft, set screw, support body and seals form an assembly ready for installation into the housing.

The assembly is installed in the housing 12 by inserting the support body 42 into the mounting bore 26 lower-end first, and passing this lower end downwardly through the threaded upper portion 30 of the mounting bore 26 and onward into the smooth-walled lower portion 32 of the bore.

The illustrated embodiment of the housing is fabricated by machining a pair of perpendicularly crossing through-bores in a cylindrical piece 71, for example by machining both bores in a piece of cylindrical stock, or by machining a new diametral cross bore into an existing pipe. An axial one of these bores defines the mounting bore 26 and is accordingly provided with female threads 30 at one of its ends. The mounting bore 26 is finished off by attaching a closed cover 72 to an end of the cylindrical piece to cap off this axial through-bore, for example on a permanent basis by welding 73. The T- or t-shape of the housing is finished off by inserting a short length of pipe, for example as defined by a pipe nipple 74, in the diametral cross-bore of the cylindrical piece 71 and fixing the same in place, for example by welding 75. The end portions of the pipe nipple 74 projecting out from the cylindrical piece 70 thus form the coaxial branches 18, 20 of the resulting T- or t-shaped housing, while the remainder of the pipe nipple 74 extends the length of the diametral bore of the cylindrical piece to define the through-flow bore 16 of the overall housing.

Figure 2:
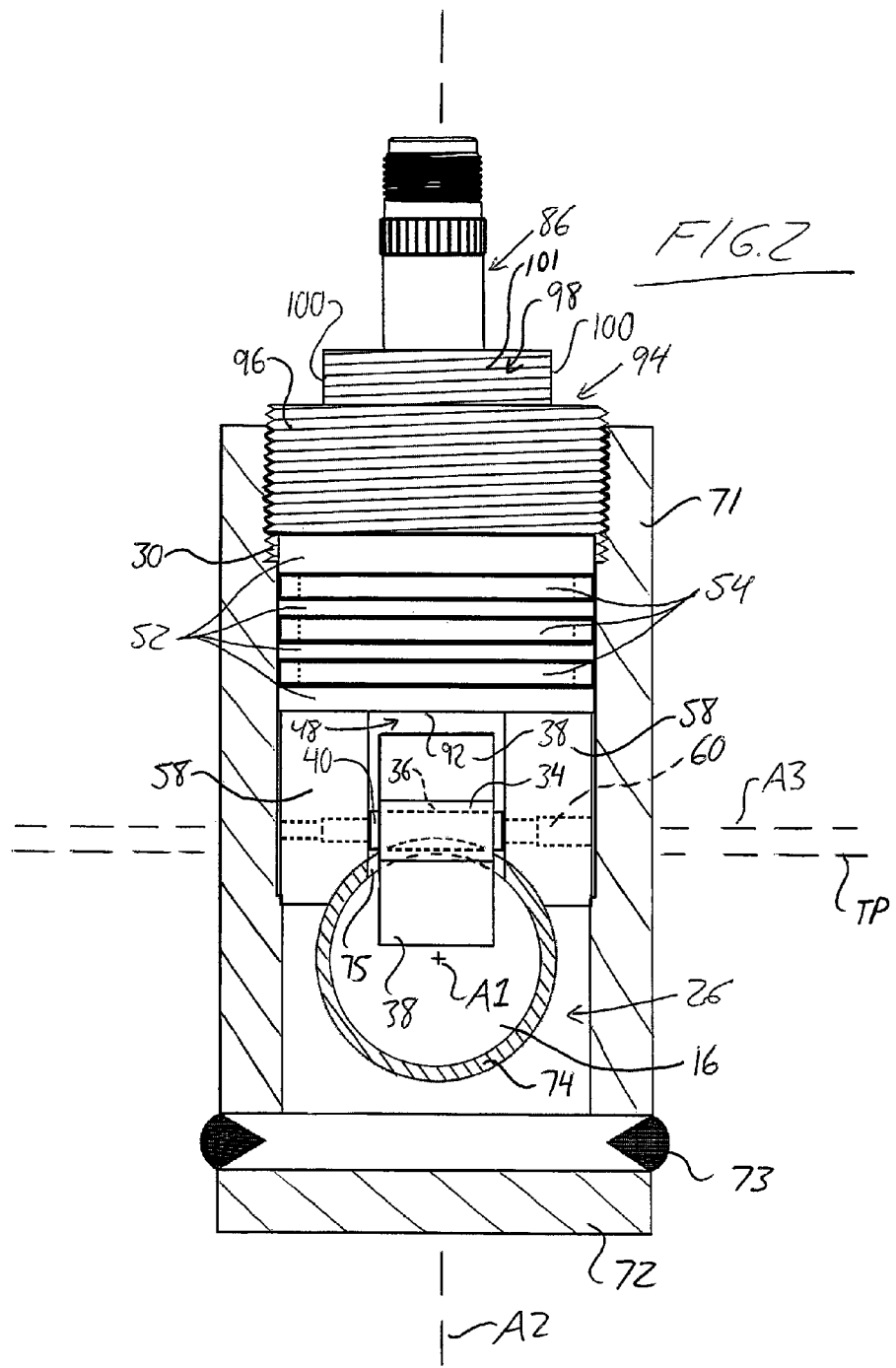
FIG. 2 is a cross-sectional view of the paddlewheel flow meter of FIG. 1 after assembly thereof.

As shown in the cross-sectional view of FIG. 2, a cutout 75 is made in the topside of the pipe nipple 74 at a central or intermediate position along the length of the pipe nipple 74 so as to reside within the axial through-bore of the cylindrical piece 71 when the pipe nipple is subsequently installed. The cutout has a width (measured parallel to the diameter of the pipe nipple) that exceeds the blade width of the paddlewheel but is less than the diameter of the pipe nipple, and a length (measured parallel to the axis A1 of the pipe nipple) that is centered on the axis A2 of the mounting bore 26 and exceeds twice the rotor radius. As shown in FIG. 2, in the fully assembled flow meter 10, the blades 38 of the paddlewheel rotor thus reach through the cutout opening 75 into the through-flow bore 16 inside the pipe nipple as they revolve around the rotational axis A3 of the rotor.

Still referring to the cross-section of FIG. 2, the mounting bore 26 has a greater diameter than the through-flow bore 16 and extends beyond a tangential plane TP of the through-flow bore 16 at a location where the axis A2 of the mounting bore first reaches the through-flow bore 16 (i.e. at the rotor accommodating cutout opening 75). The radius of the cutaway 50 at the bottom of the support body 42 equals the outside radius of the pipe nipple 74, whereby the two arcuate spans 56 disposed respectively on opposite sides of the slot 48 of the support body conformingly seat against the outer surface of the pipe nipple's cylindrical wall on opposite sides of the paddlewheel-accommodating cutout 75 upon insertion of the support body sufficiently far into the mounting bore 26 of the housing 12. The axis on which the support body's cutaway curvature is centered coincides with the flow direction axis A1 when the support body is fully installed.

With the support body so installed, the rotational axis A3 of the rotor 14 lies only a short height above the tangential plane TP at the top of the through-flow bore 16, whereby each blade 38 of the rotor 14 lies fully, or at least substantially fully, within the through-flow bore 18 when the rotor reaches the position lying perpendicular to the axis A1 of the through-flow bore 16 below the rotor axis. With continued reference to FIG. 2, the axial length of the bushing 40 may exceed that of the rotor hub 34 slightly, so long as it is less than the perpendicular distance between the two flat inner sides of the support body legs 58. Through extensive testing, Applicant has found that the best balance between accuracy of the flow meter versus the wear life of its components occurs when the rotor size and position relative to the inner diameter of the through-flow bore 16 is such that each rotor blade, when in its maximum-exposure position reaching furthest into the through-flow bore 16 (i.e. as the blade passes through a plane perpendicular to the flow direction axis A1), reaches a distance of between 46% and 50% across this inner diameter of the flow-through conduit. Testing found that rotor configurations reaching further distances into the through-flow bore were subject to premature wear in erosive applications without any significant increase in accuracy.

Figure 3A:
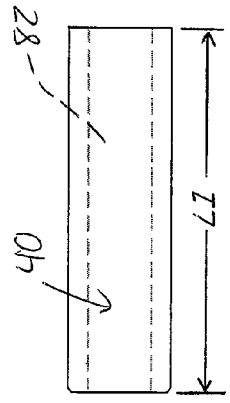
FIGS. 3A and 3B are side and end views of a rotor bushing of the paddlewheel flow meter of FIG. 1.
Figure 3B:
Figure 4B:
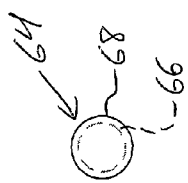

Turning to FIGS. 3 and 4, the axial length L1 of the bushing 40 exceeds the axial length L2 of the reduced diameter central portion 66 of the shaft 64, whereby under positioning the shaft inside the bushing 40 with the lengthwise-centers of the two in alignment, each end of the bushing resides around a respective one of the enlarged end portions 68 of the shaft 64. The larger diameter D1 of the shaft 64 at the end portions 68 thereof and a cylindrical internal bore 82 of the bushing 40 are machined with tight tolerances to provide sufficient clearance therebetween for rotation of the press-fit bushing around the shaft with the rotor 14, while keeping this clearance to a minimum to prevent or minimize ingress of particulate matter into bushing. In some embodiments, the tolerance is between 1.0 and 2.0 thousandths of an inch (thou), preferably no greater than 1.5 thou, and more preferably approximately 1.0 thou.

The smaller reduced diameter D2 of the central portion 66 of the shaft leaves a greater clearance so as not to contact the bushing at all under rotation of the bushing around the shaft. Accordingly, contact between the bushing and the shaft can take place over only a partial length of the bushing, thus reducing the area of which significantly tighter tolerances must be made in order to accomplish a rotational fit while providing optimal protection against particulate ingress. Preventing such ingress of particulate material carried in the fluid prevents possible jamming of rotor rotation by internal buildup of such material, reduction of balanced rotation by such material, and/or abrasive wear of the shaft or bushing by such material under the relative rotation between these components. A smooth transition between the larger and smaller diameter portions of the support shaft is provided by respective radii 84 to avoid stress risers created by sharp-cornered transitions.

In summary of the installation of the rotor, the shaft is inserted through the press fit bushing of the rotor hub via the first leg through-hole 60 of the rotor support body 42 into the second leg through-hole 62 thereof, the set screw 70 is engaged to secure the shaft and rotor in place on the support body, and then the support body is inserted into the open end of the mounting bore and freely slid further thereunto until seated in the operational position placing the rotor at the described position reaching into the through-flow bore. Using a free-sliding insertion of the support body, as opposed to a threaded engagement thereof in the mounting bore, ensures that the support body will reach the properly seated optimal operating position without bottoming out early if misthreaded or improperly aligned, and avoids the possibility that thread wear may lead to inaccuracies in the installation position over time with repeated removal and replacement of one or more support bodies in the housing. Being distinct and separable from the housing, the rotor support is fully removable from the housing by simple slide withdrawal therefrom.

With removal of the set screw, the rotor and/or shaft are likewise easily removable for inspection, and service or replacement if warranted, by withdrawing the shaft from the rotor support body, thereby withdrawing the shaft from the hub bushing of the rotor to thereby free the rotor from the support body. Accordingly, any one or more of the seals, the support body, the shaft, and the rotor can be replaced independently of replacement of any of the other of these components. Accordingly, not only can any of these be replaced without replacing the housing, but also can be removed for inspection, service, repair or replacement without detachment of the housing from the pipes on which it is installed.

In addition, referring to FIG. 1, the speed sensor unit 86 for detecting movement of the rotor blades past the sensor and sending output signals reflective of same to a suitable electronic monitoring system is also removable from the housing, replaceable separately of the housing, and furthermore is also replaceable separately and independently of the rotor support body 42 and the shaft and rotor carried thereby.

The sensor support unit 86 of the illustrated embodiment features a magnetic pickup sensor and has an externally threaded cylindrical body removably engagable with an axially-extending, internally threaded blind hole 90 extending centrally into the flat upper face 46 of the rotor support body 42. Commercially available externally threaded magnetic pickup sensor units may be used, for example such as those offered by SPECTEC of Emigrant, Mont., U.S.A. The rotor support body 42 thus has an internal cavity for receiving placement of the sensor therein. The blind hole 90 reaches a depth approaching the top end of the rotor-receiving cavity provided by the slot 48, with the closed end of the blind hole 90 stopping just short of the cavity, whereby the top wall 92 of the slot 48 prevents exposure of the sensor to the fluid from the through-flow bore 16 below. The thickness of this wall 92 between the rotor cavity 48 and the sensor cavity is sufficiently thin to allow the sensor to detect each time a rotor blade 38 passes by the lower tip of the sensor unit, which lies on the central longitudinal axis A2 of the mounting bore and rotor support body, which in turn perpendicularly intersect the rotational axis A3 of the rotor at the center of the rotor hub's axial length.

The open top end of the blind hole 90 is situated above the circumferential grooves 44 in which the seals 54 are disposed, whereby the sealed condition of the support body to the surrounding housing 10 (FIG. 2) due to use of seals 54 also prevents fluid from accessing the blind hole from above. The sensor is thus entirely isolated from exposure to fluid. Use of magnetic pickup sensors to for detecting movement of the rotor blades past the sensor and sending output signals reflective of same to a suitable electronic monitoring system for converting this into useful data on the fluid flow rate for display and/or storage of flow data is known, and thus not described in further detail herein. For example, use of such a sensor to detect rotational speed of a stainless steel paddle-wheel rotor for use in flow monitoring is described in afore-mentioned U.S. Pat. No. 6,079,280, the entirety of which is incorporated herein by reference.

Recalling that the rotor support body 42 is slidably disposed in the mounting bore, and not positively fastened in place on its own, an externally threaded cap 94 is provided for threaded engagement with the internally threaded end portion 30 of the mounting bore 26. The axial length of the rotor support body is sufficient to reach partially up into the threaded upper end portion 30 of the mounting bore 26 even when fully seated flush against the pipe nipple 74, whereby sufficient threaded advancement of the cap 94 will abut the flat underside of the cap 94 against the support body's flat upper face 46 that annularly spans around the sensor cavity 90, thereby effectively clamping the rotor support body in place against the seat effectively formed by pipe nipple inside the housing, whereby the cap holds the rotor support body stationary in the operable position and prevent unseating thereof. Due to the arcuately conforming shape of the underside of the support body and the topside of the pipe nipple, even if the sliding of the support body into the mounting bore does not automatically situate the body's lower end axis of curvature in alignment with the axis A1 of the through-flow bore 16, subsequently tightening of the cap 94 against the upper end of the support body will force the support body down against the pipe nipple, which will thereby cause the support body to shift about its axis into proper alignment with the pipe nipple axis, thus providing a self-aligning function that will automatically set the support body, and thus the paddlewheel, in their proper positions.

The cap 94 is annular in form, having a central axial through-bore 95 therein to accommodate passage of the sensor unit 86 fully or partially therethrough. As a result, the sensor unit can be installed in, and removed from, the sensor-accommodating cavity 90 of the rotor support member without have to remove the cap 94 or any other part from the housing. Accordingly, the sensor unit can be removed for inspection, service, repair or replacement without having to remove the cap that secures the rotor support member in place. As a result, the sensor unit can be removed without having to interrupt continued use of the pipeline, as the sealed condition of the flow through the housing remains intact. The central opening of the annular cap also provides a passage through which the sensor wiring, or sensor housing itself, extends while the sensor is in its operable position engaged in the sensor cavity 90 of the rotor support body, as shown in the fully assembled view of FIG. 2.

As illustrated, the cap may be configured with at least one pair of diametrically opposed wrench flats 100 on an upper portion 98 of the cap 94 for engagement thereof by a wrench to drive advancement or withdrawal of the threaded cap from its useful position clamping the rotor support body in place. The upper portion of the cap may have arcuate spans 101 that join the wrench flats 100 and span the full diameter of the cylindrical lower portion 96 of the cap 94, in which case the threading of the lower portion of the cap extends continuously onto the periphery of the upper portion 98 at these full-diameter, arcuate portions 101 thereof.

It will be appreciated that directional terms such as upper, lower, top and bottom are used in relation to the illustrated orientation of the flow meter components in the accompanying drawings and do not necessarily reflect particular orientations in which the components must be positioned for operational use of the flow meter. Accordingly, in another labeling convention, the above described upper and lower ends of the support body may alternatively be referred to as outer and inner ends respectively, as the lower end resides further inwardly of the housing relative to the open end of the mounting bore 26 than the upper end, which sits nearer the open end of the mounting bore.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A paddlewheel flow meter comprising:
   a housing having an internal through-flow bore passing therethrough on a flow direction axis, and an internal mounting bore extending into the housing on a mounting bore axis transverse to through-flow bore and opening into the through-flow bore;
   a rotor support body having inner and outer ends spaced apart along a longitudinal axis, a shaft-receiving bore in the rotor support body that lies transverse to the longitudinal axis thereof, a support shaft received in the shaft-receiving bore and a paddlewheel rotor installed on the support shaft for rotation about a rotational axis lying transverse to the longitudinal axis in a hollow rotor cavity of the rotor support body adjacent the inner end thereof, the rotor support body being arranged for removable receipt thereof in the mounting bore at an operational position in which the paddlewheel rotor reaches into the through-flow bore for driven rotation of the paddlewheel rotor by movement of flowable material through the through-flow bore; and
   a sensor unit arranged for removable receipt in the mounting bore at an installed position placing a rotational sensor of the sensor unit at a useful position operable to detect rotational motion of the paddlewheel rotor about the rotational axis;
   wherein the sensor unit and rotor support body are distinct units that are replaceable separately of one another, thereby enabling replacement of the sensor independently of the rotor, or vice versa, by replacement of only one of the sensor unit and the rotor support body.

2. The flow meter of claim 1 wherein the sensor unit is received in a hollow sensor cavity of the rotor support body in the installed position.

3. The flow meter of claim 2 wherein the hollow sensor cavity extends into the rotor support body at the outer end thereof.

4. The flow meter of claim 2 wherein the hollow sensor cavity of the rotor support body is internally threaded, and the sensor unit is externally threaded for mating threaded engagement thereof in the hollow sensor cavity.

5. The flow meter of claim 1 wherein the rotor support body is sealed to a boundary wall of the mounting bore around a periphery of the rotor support body.

6. The flow meter of claim 5 comprising at least one annular seal disposed around the rotor support body.

7. The flow meter of claim 1 wherein the rotor support body, in the operational position, resides entirely outside the through-flow bore.

8. The flow meter of claim 1 wherein the inner end of the rotor support body is concavely contoured about a center axis of curvature that lies parallel to the flow direction axis of the housing.

9. The flow meter of claim 8 wherein the concavely contoured inner end of the rotor support body conforms with an outer surface of a boundary wall of the through-flow bore on either side of an opening in said boundary wall of the through-flow bore, and the paddlewheel rotor reaches into the through-flow bore through said opening in said boundary wall of the through-flow bore.

10. The flow meter of claim 1 comprising a cap engagable to the housing at an open end of the mounting bore to secure the rotor support body therein.

11. The flow meter of claim 10 wherein the cap is arranged to abut against the rotor support body under engagement of the cap to the housing to clamp the support body in the operational position.

12. The flow meter of claim 10 wherein the closure cap comprises a through-bore therein to accommodate insertion of the sensor unit and withdrawal thereof through and from the through-bore of the closure cap for installation and removal of the sensor unit to and from the housing.

13. The flow meter of claim 1 comprising a support shaft that is carried on the rotor support body and about which the paddlewheel rotor is rotatable, wherein the support shaft is removable from the rotor support body to enable removal of the rotor therefrom.

14. The flow meter of claim 1 comprising a support shaft that is carried on the rotor support body and about which the paddlewheel rotor is rotatable, wherein the support shaft comprises at least one reduced diameter portion disposed inside a hub of the rotor between larger diameter portions of said shaft, the reduced diameter portion having a clearance space therearound for contactless rotation of the rotor around said reduced-diameter portion.

15. The flow meter of claim 14 comprising radiused transitions between the reduced diameter portion of the shaft and the larger diameter portions of the shaft.

16. The flow meter of claim 14 comprising a bushing received within the hub of the rotor for rotation therewith about the shaft.

17. A paddlewheel flow meter comprising:

a housing having an internal through-flow bore passing therethrough on a flow direction axis, and an internal mounting bore extending into the housing on a mounting bore axis transverse to through-flow bore and opening into the through-flow bore;

a rotor support body having inner and outer ends spaced apart along a longitudinal axis and a paddlewheel rotor rotatably supported on the rotor support body for rotation about a rotational axis lying transverse to the longitudinal axis in a hollow rotor cavity of the rotor support body adjacent the inner end thereof, the rotor support body being arranged for removable receipt thereof in the mounting bore at an operational position in which the paddlewheel rotor reaches into the through-flow bore for driven rotation of the paddlewheel rotor by movement of flowable material through the through-flow bore; and a sensor unit operable to detect rotational motion of the paddlewheel rotor about the rotational axis;

wherein the inner end of the rotor support body is concavely contoured about a center axis of curvature that lies parallel to the flow direction axis of the housing to conform with an outer surface of a boundary wall of the through-flow bore on either side of an opening in said boundary wall through which the rotor is arranged to reach into the through-flow bore.

* * * * *